S. SIMPSON.
CLUTCH FACING AND PROCESS OF MAKING THE SAME.
APPLICATION FILED FEB. 6, 1919.
1,348,755.
Patented Aug. 3, 1920.
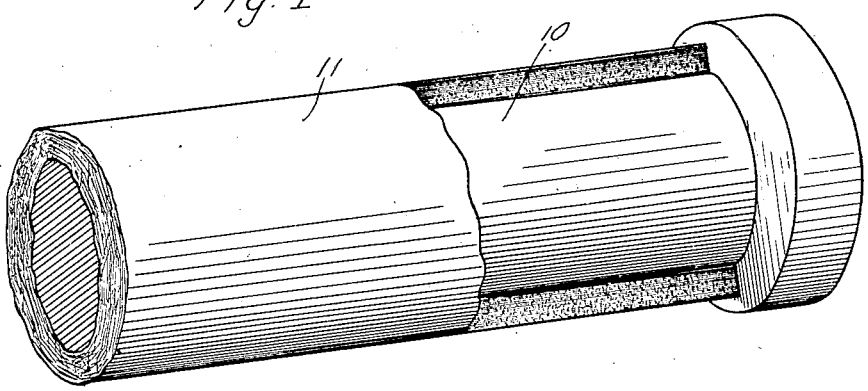
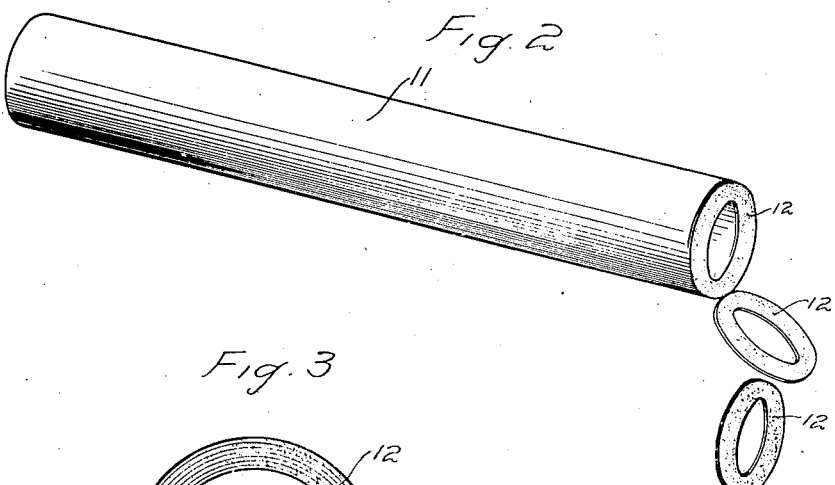
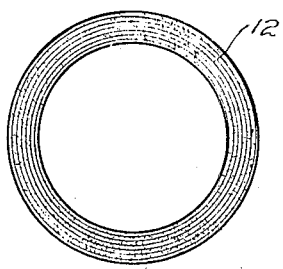
INVENTOR
Sumner Simpson
BY
A. M. Wooster
ATTORNEY

UNITED STATES PATENT OFFICE.

SUMNER SIMPSON, OF BRIDGEPORT, CONNECTICUT, ASSIGNOR TO THE RAYBESTOS COMPANY, OF BRIDGEPORT, CONNECTICUT, A CORPORATION OF CONNECTICUT.

CLUTCH-FACING AND PROCESS OF MAKING THE SAME.

1,348,755. Specification of Letters Patent. Patented Aug. 3, 1920.

Application filed February 6, 1919. Serial No. 275,467.

*To all whom it may concern:*

Be it known that I, SUMNER SIMPSON, a citizen of the United States, residing at Bridgeport, county of Fairfield, State of Connecticut, have invented an Improvement in Clutch-Facings and Processes of Making the Same, of which the following is a specification.

This invention has for its object to produce clutch facings adapted for general use, as in automobile clutches, which shall have a high coefficient of friction, shall be capable of resisting a high degree of heat without chemical or physical change, shall be homogeneous, tough and exceedingly durable, and which may be produced at a relatively low cost for a high grade facing.

With these and other objects in view I have devised a novel clutch facing and process of making the same from asbestos paper, my novel process enabling me to use paper made from fiber asbestos, so called, that is a grade of asbestos in which the fibers are too short for spinning, and to produce clutch facings in which the wear is upon the edges of the layers, which are thoroughly compacted and made homogeneous.

In the accompanying drawing forming a part of this specification,

Figure 1 is a perspective view, partly broken away, showing a mandrel with the asbestos paper wound thereon;

Fig. 2 a perspective view, on a reduced scale, showing how the roll, after treatment, is sliced into clutch facings, and Fig. 3 is an elevation of one of my novel clutch facings.

10 denotes a mandrel, 11 a tube formed by winding asbestos paper thereon, and 12 rings for clutch facings which are sliced from the tube.

The process of making is as follows: Sheets of asbestos paper are rolled tightly upon a mandrel, that is under tension, to produce tubes of the required external diameter. The tubes are then removed from the mandrel and are then saturated by immersion in a suitable hardening solution or binder, which may consist of various vegetable oils or gums, or mineral oils or gums, or any derivative of either or combination thereof. Asphaltic compounds may also be employed, or any one of various organic or inorganic solutions of primarily viscous and subsequently hardening character, in brief, any substance that will not only effect the desired cohesion between the layers but will also be waterproof and oilproof and possess the essential heat and wear resisting qualities. The treated tubes are then baked in a suitable oven and dried thoroughly. This baking operation solidifies and hardens the tubes so that each tube becomes a compact, homogeneous mass. The tubes are then sliced into rings by means of any suitable cutter or saw. Both faces of the rings are then ground to produce clutch facings of the exact thickness required, ordinarily a tolerance of five thousandths of an inch only being allowed. If required for exceedingly accurate use either the interior or the exterior, or both, of the rings may be ground as well, it being practicable to come within two thousandths of an inch tolerance with respect to both the face and the interior and exterior grinding.

The product of my novel process is a dense, hard, homogeneous clutch facing, formed from superposed layers of asbestos paper in which the wear in use is upon the edges of the layers.

Having thus described my invention, I claim:

1. The process of making clutch facings which consists in winding sheets of asbestos paper under tension to form tubes, saturating the tubes in a hardening solution after winding, baking, and then slicing the tubes into rings to form clutch facings.

2. The process of making clutch facings which consists in winding a sheet of asbesto paper on a mandrel under tension, removing the tube from the mandrel, saturating the tube so formed with a hardening binder, then baking and then slicing the tube into rings.

3. The process of making clutch facings which consists in winding a sheet of asbestos paper on a mandrel under tension, removing the tube from the mandrel, saturating the tube so formed with a hardening binder, then baking, then slicing the tube into rings, and then grinding the faces of the rings.

4. The process of making clutch facings which consists in winding a sheet of asbestos paper on a mandrel under tension, saturating with a hardening solution, whereby the layers are caused to adhere, baking, slicing the roll into rings, and then grinding the faces of the rings.

5. The process of making clutch facings which consists in winding a sheet of asbestos paper on a mandrel under tension, saturating with a hardening solution, whereby the layers are caused to adhere, baking, slicing the roll into rings, grinding the faces of the rings, and grinding them internally and externally.

6. A clutch facing consisting of a plurality of layers of asbestos paper wound under tension and caused to adhere by means of a hardening solution of a primarily viscous and subsequently hardening character.

7. A clutch facing consisting of a plurality of layers of asbestos paper wound under tension and caused to adhere by means of a hardening solution of a primarily viscous and subsequently hardening character and baked to dry thoroughly.

8. A clutch facing consisting of a plurality of layers of asbestos paper wound under tension and caused to adhere by means of a hardening solution of a primarily viscous and subsequently hardening character and having its faces ground to produce the required thickness.

9. A clutch facing consisting of a plurality of layers of asbestos paper wound under tension and caused to adhere by means of a hardening solution of a primarily viscous and subsequently hardening character and baked and ground to size.

In testimony whereof I affix my signature.

SUMNER SIMPSON.